(12) United States Patent
Sano

(10) Patent No.: US 8,385,686 B2
(45) Date of Patent: Feb. 26, 2013

(54) IMAGE PROCESSING METHOD BASED ON PARTITIONING OF IMAGE DATA, IMAGE PROCESSING DEVICE BASED ON PARTITIONING IMAGE DATA AND PROGRAM

(75) Inventor: Hisashi Sano, Tokyo (JP)

(73) Assignee: Nikon Corporation, Tokyo (JP)

( * ) Notice: Subject to any disclaimer, the term of this patent is extended or adjusted under 35 U.S.C. 154(b) by 1570 days.

(21) Appl. No.: 10/577,014

(22) PCT Filed: Oct. 29, 2004

(86) PCT No.: PCT/JP2004/016116
§ 371 (c)(1),
(2), (4) Date: Apr. 28, 2006

(87) PCT Pub. No.: WO2005/041124
PCT Pub. Date: May 6, 2005

(65) Prior Publication Data
US 2007/0065043 A1    Mar. 22, 2007

(30) Foreign Application Priority Data

Oct. 29, 2003    (JP) ................................. 2003-369157

(51) Int. Cl.
G06K 9/32 (2006.01)
G06K 9/36 (2006.01)
G09G 5/00 (2006.01)
H04N 9/74 (2006.01)
G06F 7/38 (2006.01)

(52) U.S. Cl. ........ 382/293; 382/295; 382/287; 345/619; 348/580; 708/442

(58) Field of Classification Search ................. 382/293, 382/295, 287; 345/619–689; 348/580; 708/442
See application file for complete search history.

(56) References Cited

U.S. PATENT DOCUMENTS
5,675,380 A * 10/1997 Florent et al. ................. 348/251
(Continued)

FOREIGN PATENT DOCUMENTS
JP    A 11-250238    9/1999
JP    A 2000-200344    7/2000
(Continued)

*Primary Examiner* — Randolph I Chu
(74) *Attorney, Agent, or Firm* — Oliff & Berridge, PLC

(57) ABSTRACT

The present invention relates to an image processing method, image processing device and program which make it possible to shorten the processing time, and which also make it possible to set tile regions in appropriate ranges, by dividing one image into a plurality of regions and performing a transformation for each of these regions. The post-transformation image is divided into a plurality of tile regions, and transformation processing and the like are successively performed, with each of these tile regions as the object. In cases where a given tile region that is the object of processing contains a central axis that passes through the origin of the post-transformation image, the tile size of this region is altered by the tile size determining part 41 so that this region does not contain a central axis. The regions on the pre-transformation image corresponding to the tile regions that are the object of processing are calculated by the image region calculating part, and the pixel data contained in the calculated regions is read out from the storage part 18. The present invention can be used in personal computers or the like that process image data acquired by means of a digital camera.

12 Claims, 13 Drawing Sheets

U.S. PATENT DOCUMENTS

| | | | |
|---|---|---|---|
| 6,538,691 B1 * | 3/2003 | Macy et al. | 348/222.1 |
| 7,565,004 B2 * | 7/2009 | Hashimoto | 382/154 |
| 7,565,044 B2 * | 7/2009 | Akahoshi et al. | 385/16 |
| 2003/0021492 A1 * | 1/2003 | Matsuoka et al. | 382/295 |
| 2005/0205778 A1 * | 9/2005 | Kitai et al. | 250/309 |
| 2009/0046179 A1 * | 2/2009 | Aoyama et al. | 348/241 |

FOREIGN PATENT DOCUMENTS

| | | | |
|---|---|---|---|
| JP | A 2001-086332 | | 3/2001 |
| JP | A 2001-250114 | | 9/2001 |
| JP | A 2004-064710 | | 2/2004 |
| WO | WO2004/019607 | * | 3/2004 |

* cited by examiner

POST-TRANSFORMATION IMAGE

PRE-TRANSFORMATION IMAGE

BEFORE SIZE ALTERATION OF TILE REGIONS

IMAGE PROCESSING METHOD BASED ON PARTITIONING OF IMAGE DATA, IMAGE PROCESSING DEVICE BASED ON PARTITIONING IMAGE DATA AND PROGRAM

TECHNICAL FIELD

The present invention relates to an image processing method, image processing device and program which are devised so that in cases where one image is divided into a plurality of regions and a projection transformation is performed for the image data of each region, these regions can be set in appropriate ranges.

BACKGROUND ART

In cases where photography is performed using a digital camera or the like, depending on the object of imaging, barrel type distortion in which the object of imaging bulges outward, or bobbin type distortion in which the object of imaging is indented inward, may be conspicuous.

Accordingly, in order to correct such distortion, the image data that is picked up is input into a personal computer, and a correction such as a geometrical transformation or the like is performed on this personal computer.

Techniques for performing such a geometrical transformation on images include the technique disclosed in Japanese Patent Application Laid-Open No. 2001-250114.

Patent Document 1: Japanese Patent Application Laid-Open No. 2001-250114

DISCLOSURE OF THE INVENTION

Conceivable methods for performing a geometrical transformation on images using a personal computer include a method in which one entire image is transformed at one time, and a method in which one image is divided into a plurality of regions, and a transformation is performed for each region.

In cases where one entire image is transformed at one time, the capacity of the RAM (random access memory) that stores the entire image that is the object of transformation (i.e., the image prior to transformation) must naturally be larger than in cases where one image is divided into a plurality of regions, and a transformation is performed for each region. Accordingly, the following problem is encountered: namely, in cases where this transformation is performed in parallel with other processing, a sufficient RAM capacity cannot be ensured, so that the image transformation takes time. In cases where a sufficient RAM capacity cannot be ensured, a virtual memory is formed on an HDD (hard disk drive) or the like, which has a slower transmission rate than the RAM, and processing is performed on this HDD; in this case, however, the processing time becomes even longer.

This task is also made redundant as the number of pixels in image pickup elements becomes increasingly greater, so that the amount of data in one image is increased.

On the other hand, in cases where one image is divided into a plurality of regions, and a transformation is performed for each region, the setting of the regions is a problem. Specifically, the image that is obtained by photography includes distortion; accordingly, if this distortion is not taken into account in setting the regions, there is a danger that the data that is referred to in the interpolation of pixels or the like that is required for the geometrical transformation will not be contained in the regions that are set as the object of processing.

The present invention was devised in the light of such conditions; it is an object of the present invention to shorten the processing time by dividing one image into a plurality of regions, and performing a transformation for each of these regions, and to set these regions in appropriate ranges.

The image processing method of the present invention comprises a region setting step for setting first regions by partitioning an image obtained subsequent to transformation of the captured image by lines parallel to a horizontal axis and a vertical axis passing through an origin, and a transformation step for transforming second regions prior to the transformation of the image, which correspond to the first regions set by the processing of the region setting step, into the first regions by a projection transformation, and is characterized in that the first regions are set by the processing of the region setting step so that these first regions do not include the horizontal axis or vertical axis.

The system may be devised so that first regions that contain at least either the horizontal axis or vertical axis in cases where these regions are set at a default size by the processing of the region setting step are further divided to produce regions that do not contain the horizontal axis or vertical axis.

In cases where first regions that contain at least either the horizontal axis or vertical axis exist when set at the default size by the processing of the region setting step, the system may be devised in such a manner that the sizes of all of the first regions are altered so that none of the regions contains the horizontal axis or vertical axis.

The image processing device of the present invention comprises region setting means for setting first regions by partitioning an image obtained subsequent to transformation of the captured image by lines parallel to a horizontal axis and a vertical axis passing through an origin, and transformation means for transforming second regions prior to the transformation of the image, which correspond to the first regions set by the processing of the region setting step, into the first regions by a projection transformation, and is characterized in that the region setting means sets the first regions so that these first regions do not contain the horizontal axis or vertical axis.

The program of the present invention comprises a region setting step for setting first regions by partitioning an image obtained subsequent to transformation of the captured image by lines parallel to a horizontal axis and a vertical axis passing through an origin, and a transformation step for transforming second regions prior to the transformation of the image, which correspond to the first regions set by the processing of the region setting step, into the first regions by a projection transformation, wherein the first regions are set so that these regions are formed as regions that do not contain the horizontal axis or vertical axis by the processing of the region setting step.

In the image processing method, image processing device and program of the present invention, images following the transformation of captured images are partitioned by lines parallel to the horizontal axis and vertical axis passing through the origin, so that first regions are set. Furthermore, second regions prior to the transformation of the images are subjected to a projection transformation into first regions corresponding to the set first regions. Moreover, the first regions are set so that these regions do not contain the horizontal axis or vertical axis.

The present invention makes it possible to obtain images in which distortion is reduced in a shorter time.

Furthermore, the present invention makes it possible to read out image data that is the object of processing in a reliable manner from a storage part storing data for the image as a whole even in cases where a transformation is performed for each region.

BEST MODE FOR CARRYING OUT THE INVENTION

Figure 1:
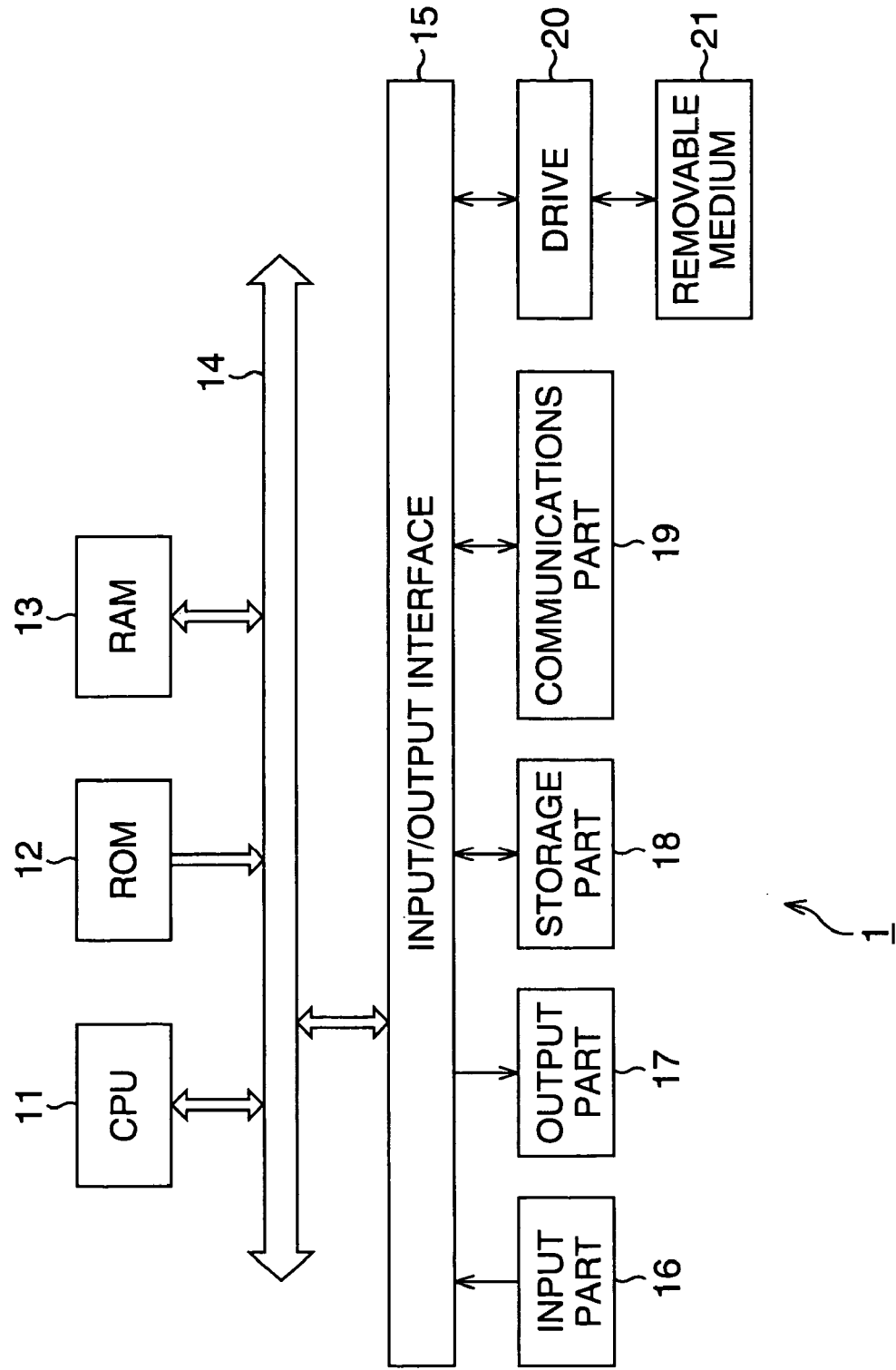
FIG. 1 is a block diagram showing an example of the construction of a personal computer applying the present invention.

FIG. 1 is a block diagram showing an example of the construction of a personal computer 1 applying the present invention.

The CPU (central processing unit) 11 executes various types of processing in accordance with programs stored in the ROM (read only memory) 12, or programs that are loaded into the RAM (random access memory) 13 from the storage part 18. For example, image processing programs that perform various types of processing on images captured by means of a digital camera are stored in the storage part 18. Furthermore, data and the like required by the CPU 11 in the execution of various types of processing are appropriately stored in the RAM 13.

The CPU 11, ROM 12 and RAM 13 are connected to each other via a bus 14. Furthermore, an input/output interface 15 is also connected to this bus 14.

An input part 16 consisting of a keyboard, mouse and the like, a display consisting of a CRT (cathode ray tube), LCD (liquid crystal display) or the like, an output part 17 consisting of a speaker or the like, a storage part 18 constructed from an HDD (hard disk drive) or the like, and a communications part 19 which performs communications via a network, are connected to the input/output interface 15.

If necessary, furthermore, a drive 20 is connected to the input/output interface 15, and a removable medium 21 consisting of a magnetic disk, optical disk, optical-magnetic disk, semiconductor memory or the like is appropriately mounted in this drive 20.

In the personal computer 1 constructed as described above, for example, images captured by means of a digital camera are input, and transformation processing that is used to correct barrel type distortion or bobbin type distortion contained in these images is performed.

Figure 2:
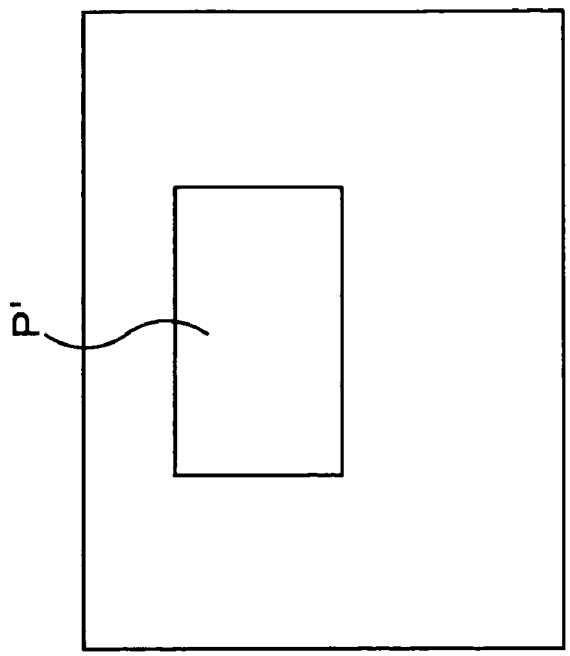
FIG. 2 is a diagram showing an example of an image prior to transformation, and an example of an image following transformation.
Figure 2:
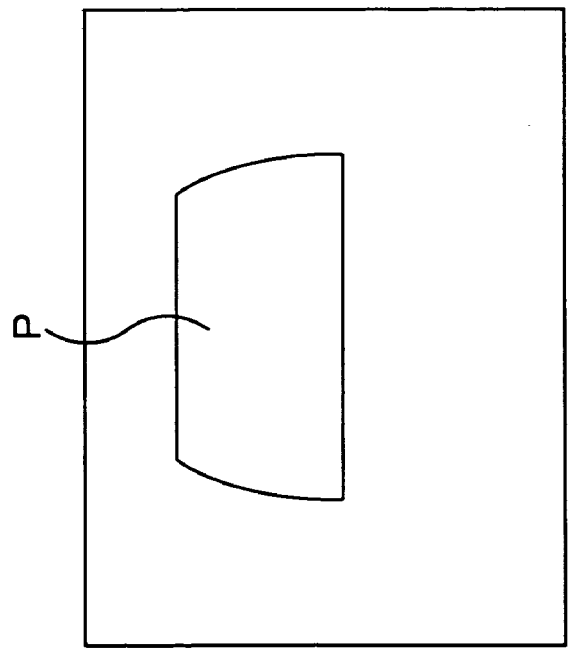

FIG. 2 is a diagram showing an example of an image in which the object of imaging shows barrel type distortion (an image in which barrel type distortion is generated), and an example of the transformed image that is obtained by transforming this image, in a case where a rectangular object of imaging is photographed.

The object of imaging P appearing in the image prior to transformation shown on the left side shows a difference in length between the lower side and upper side, and a distorted curvature in lines oriented in the vertical direction, as a result of lens distortion. In the personal computer 1 shown in FIG. 1, transformation processing is performed on such an image, so that a post-transformation image (image shown on the right side) containing an object of imaging P' that expresses the original shape of the object of imaging is obtained.

Furthermore, for example, the data of the image prior to transformation is input into the personal computer 1 (storage part 18) by mounting a removable medium 21 which is mounted on the digital camera (not shown in the figures), and which stores the captured image, in the drive 20.

Figure 3:
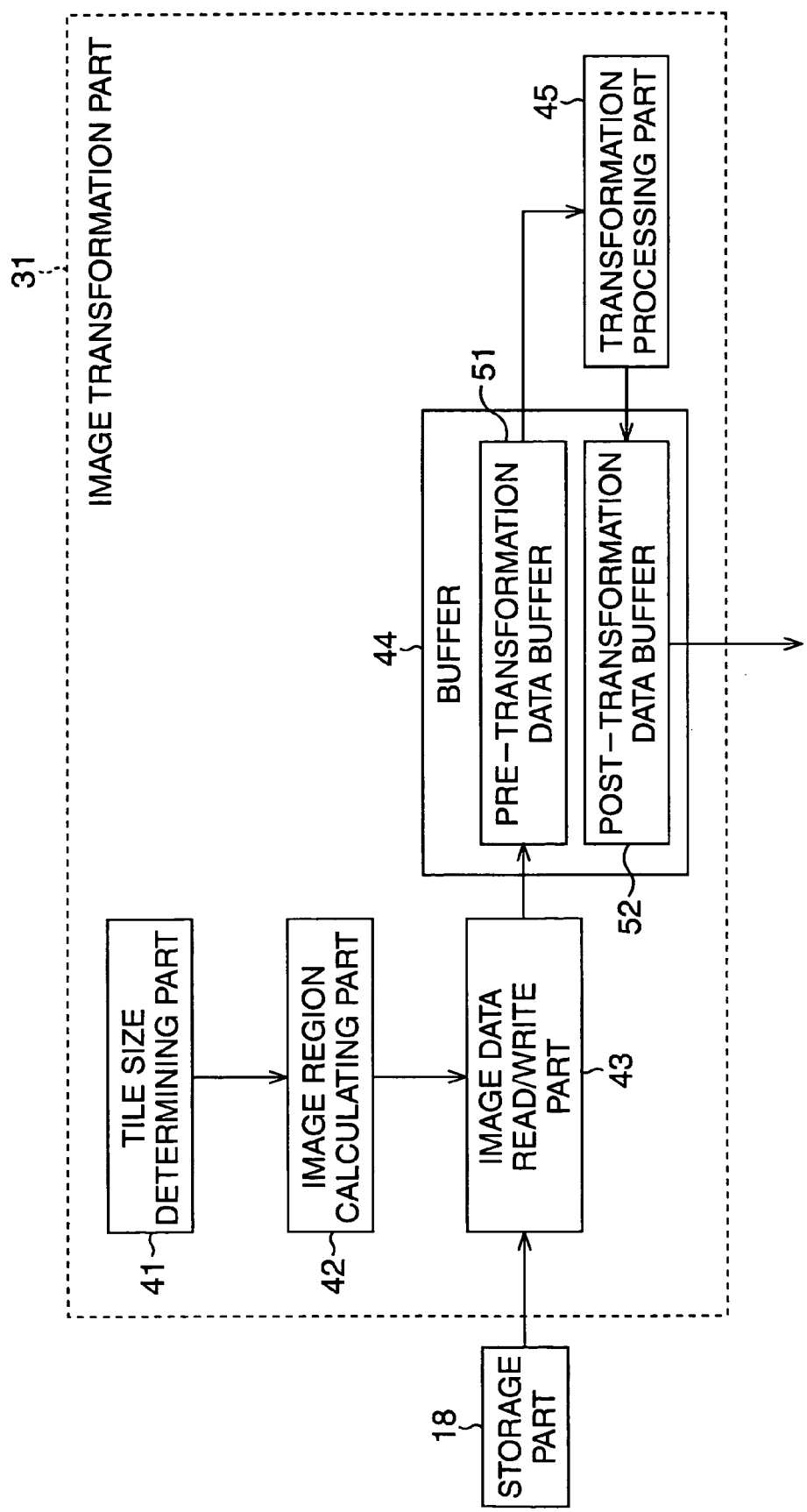
FIG. 3 is a block diagram showing an example of the functional construction of the image transformation part.

FIG. 3 is a block diagram showing an example of the functional construction of the image transformation part 31 that is realized by the execution of an image processing program by the CPU 11 in FIG. 1.

In the image transformation part 31, as will be described in detail later, the image following transformation of the captured image is divided, and transformation processing and the like are performed in order with each of a plurality of regions arranged in the form of tiles (hereafter referred to as "tile regions" for convenience) taken as objects.

For example, when the user designates a specified image stored in the storage part 18 by operating the input part 16, and then gives instructions to perform transformation processing that corrects the distortion of this image, information indicating the size and amount of data of the designated image is input into the tile size determining part 41. The tile size determining part 41 also has information relating to the capacity of the buffer (RAM 13) that is used to perform transformation processing, and determines the tile size (size of the tile regions) on the basis of information relating to the size and amount of data of the image, information relating to the capacity of the buffer and the like.

Furthermore, the tile size determining part 41 determines the tile size, and also selects one tile region that is taken as the object of processing, and outputs information expressing the position of the tile region that is taken as the object of processing to the image region calculating part 42.

As will be described later, in cases where the tile region that is the object of processing contains the horizontal axis or vertical axis passing through the origin (hereafter, referred to collectively as the central axes for convenience), the tile size determining part 41 alters the tile size so that this tile region does not contain the central axes.

The image region calculating part 42 calculates the region on the image prior to transformation that corresponds to the tile region taken as the object of processing. Furthermore, the image region calculating part 42 calculates a rectangular or square region containing the calculated region on the image prior to processing, and outputs information expressing the position of the calculated region to the image data read/write part 43.

The image data read/write part 43 reads out image data contained in the region calculated by the image region calculating part 42 from the storage part 18, and stores the read-out data in a pre-transformation data buffer 51 formed in the buffer 44.

The transformation processing part 45 refers to the pre-transformation data stored in the pre-transformation data buffer 51, performs a projection transformation on the respective pixels, performs interpolation of the pixels (if necessary), and stores the post-transformation data thus obtained in a post-transformation data buffer 52 formed in the buffer 44.

The processing performed by the respective parts described above is performed for each tile region, and (for example) when a single overall image with reduced distortion is stored in the post-transformation data buffer 52, the post-transformation data is output from the image transformation part 31. The data output from the image transformation part 31 is again stored in the storage part 18, or is used to display a post-transformation image on the display.

Next, the processing that is performed by the image transformation part 31 will be described.

Figure 4:
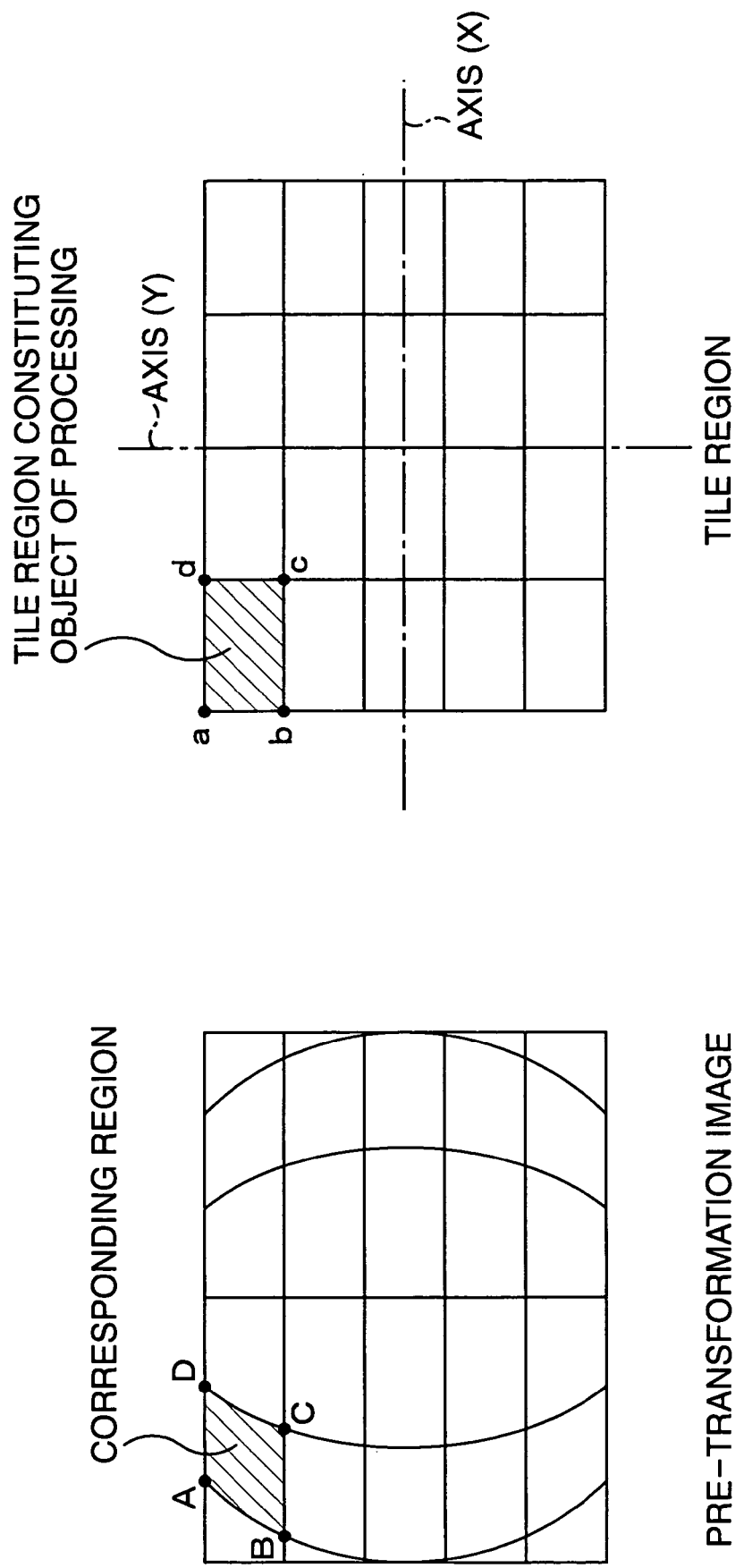
FIG. 4 is a diagram showing an example of a tile region, and an example of the image prior to transformation.

FIG. 4 is a diagram showing examples of the post-transformation image (tile region) and pre-transformation image.

In cases where an image is captured by means of a lens in which the image is distorted, such as a fish-eye lens or the like, as is shown on the left side of the figure, an image is obtained in which the object of imaging (lattice) shows barrel type distortion. For convenience of description, only the distortion in the lateral direction is shown in FIG. 4 (the same is true in FIG. 6).

For example, as is shown on the left side of FIG. 4, in a case where the image following transformation is divided by lines parallel to the X axis (which is the horizontal axis) and Y axis (which is the vertical axis) passing through the origin, and the tile region that is the object of processing in this case is the upper left region indicated by shading, the image transformation part 31 calculates the corresponding points ABCD on the pre-transformation image from the positions of the four vertices a, b, c and d.

Here, the projection transformation will be described.

The lens that is mounted on the digital camera or the like is ordinarily designed so that the relationship of the following equation (1) is substantially satisfied.

[Equation 1]

$$y = f \times \tan \theta \qquad (1)$$

In equation (1), "y" indicates the image height, "f" indicates the focal distance, and "θ" indicates the half screen angle.

In cases where an image is captured using a digital camera in which a lens satisfying this relationship is mounted, the rectilinear portion of the object of imaging is focused on the imaging plane as straight lines. Depending on the type of lens used, however, there may be lenses which are designed so that the relationship of equation (1) is not satisfied. Especially in cases where acquired using a broad-angle lens with a short focal distance is viewed, the rectilinear portions may appear to be clearly distorted as shown on the left side of FIG. 2.

Furthermore, in the case of a fish-eye lens, the lens by nature is not designed with equation (1) as a goal, and also differs according to the projection system with respect to the light-receiving plane, such as a three-dimensional projection system, equal-distance projection system or the like. Accordingly, the lens is designed from the outset with the presumption that the image will be distorted.

Accordingly, the transformation based on the following equation (2) can be used as a transformation for reducing the distortion of images captured using a lens designed from the outset with the presumption that the image will be distorted.

[Equation 2]

$$L1 = A \times \tan [y^{-1}(L0)] \qquad (2)$$

In equation (2), "L0" indicates the distance of the pre-transformation image from the optical axis (center), and "L1" indicates the distance of the post-transformation image from the optical axis. Furthermore, "y(θ)" indicates the characteristics of the zenith angle and image height of the liens, and "A" is a constant that stipulates the image pickup range.

The distortion of the image as a whole is reduced by transforming the positions of the respective pixels contained in the pre-transformation image according to equation (2). For example, in FIG. 4, when points A through D of the pre-transformation image are transformed by equation (2), points a through d of the tile region are respectively calculated as the corresponding positions.

Thus, post-transformation pixel positions corresponding to the pre-transformation pixel positions can be calculated by a transformation using equation (2). Conversely, furthermore, pre-transformation pixel positions corresponding to the post-transformation pixel positions can be calculated by performing a reverse transformation using equation (2).

Accordingly, the image region calculating part 42 shown in FIG. 3 determines the region consisting of points A through D on the pre-transformation image corresponding to the tile region that is the object of processing by calculating the respectively corresponding positions on the pre-transformation image from equation (2) for the four vertices a through d of the tile region that is the object of processing (FIG. 4).

Figure 5:
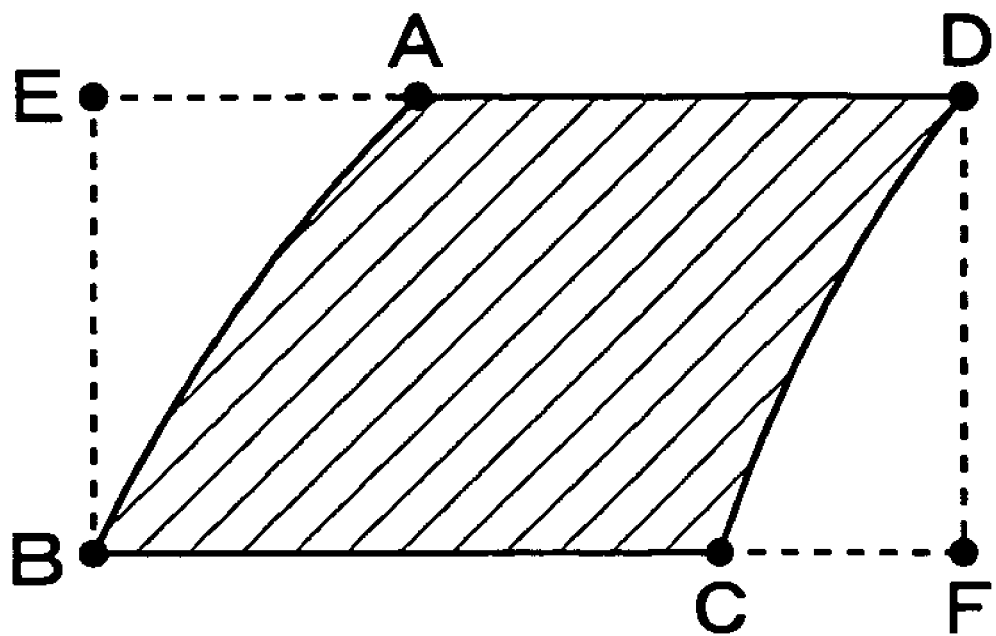
FIG. 5 is an enlarged view of a certain region in FIG. 4.

Furthermore, the image region calculating part 42 calculates (for example) the rectangular region consisting of the points EBFD shown in FIG. 5 in order to read out the pixel data used in the processing performed by the transformation processing part 45. FIG. 5 shows an enlargement of the area in the vicinity of the points ABCD in FIG. 4; the region consisting of the points ABCD is contained in the rectangular region consisting of the points EBFD.

Thus, in cases where no central axes are contained in the tile region that is the object of processing, a square region (e.g., the region consisting of the points EBFD in FIG. 5) containing a region on the pre-transformation image corresponding to the tile region that is the object of processing is calculated by the image region calculating part 42, and the data for the pixels contained in the calculated region (data for the pixels within the square consisting of the points EBFD) is read out from the storage part 18.

As a result, the read-out of data can easily be performed. Specifically, in cases where the data for the pixels contains in the region consisting of the points ABCD in FIG. 5 (region containing curved lines) is read out, it is necessary to designate the positions of the respective pixels each time; on the other hand, in cases where the data for the pixels contained in the region consisting of the points EBDF (region consisting only of straight lines) is read out, this can be accomplished merely by designating the positions of the vertices.

In FIG. 4, it was assumed that the tile region constituting the object of processing did not contain any central axes. However, as shown on the right-hand side in FIG. 6, in cases where (for example) the tile region that is the object of processing in this case is a region that contains a central axis (the X axis in the case of FIG. 6), the tile size determining part 41 alters the tile size so that the tile region that is the object of processing does not contain any central axes.

Figure 6:
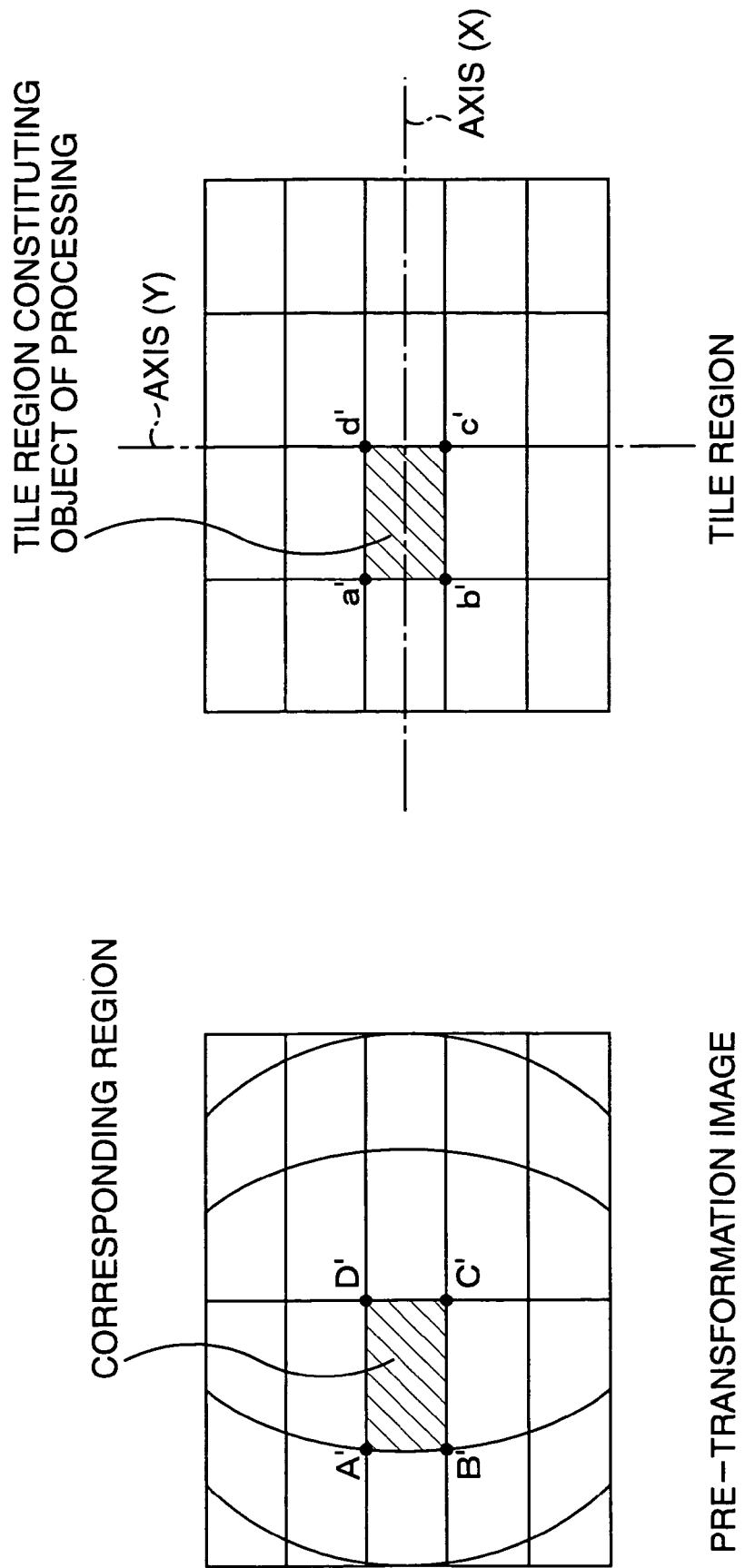
FIG. 6 is a diagram showing another example of a tile region, and another example of the image prior to transformation.

Specifically, in a case where the tile region with the points a'b'c'd' as vertices is taken as the tile region that is the object of processing, and the region on the pre-transformation image corresponding to this region is calculated from the reverse transformation of equation (2), a region consisting of the points A'B'C'D' which has a curve that bulges slightly outward on the left side is calculated as shown on the left side of FIG. 6.

Figure 7:
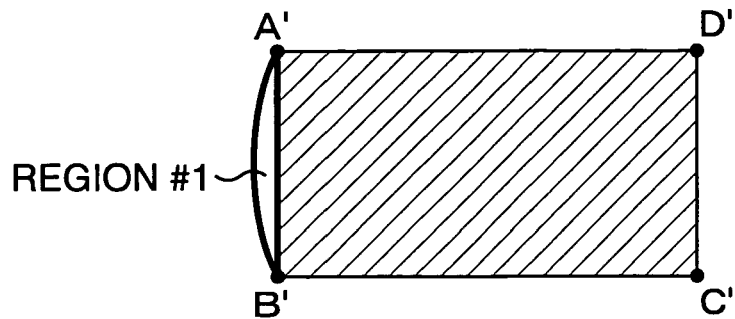
FIG. 7 is an enlarged view of a certain region in FIG. 6.

FIG. 7 shows an enlargement of the region consisting of the points A'B'C'D' in FIG. 6. Here, as was described above, in a case where the vertices of a square consisting of the points A'B'C'D' are designated as the pixel region for which data is to be read out, only the region indicated by shading in FIG. 7 is designated. In other words, the region #1 surrounded by a thick line on the left side is not designated, and the pixel data contained in this region #1 is not read out. Since the projection transformation, interpolation processing and the like are performed on the basis of the data that is read out, data that is the object of this projection transformation and interpolation processing is not read out in cases where the pixel region for which data is to be read out is thus designated.

Accordingly, in cases where central axes are thus contained in the tile region, the tile size determining part 41 alters the tile size so that the tile region that is the object of processing is converted into a region that does not contain central axes, thus ensuring that the pixel data that is the object of the projection transformation and interpolation processing can be securely read out.

Figure 8:
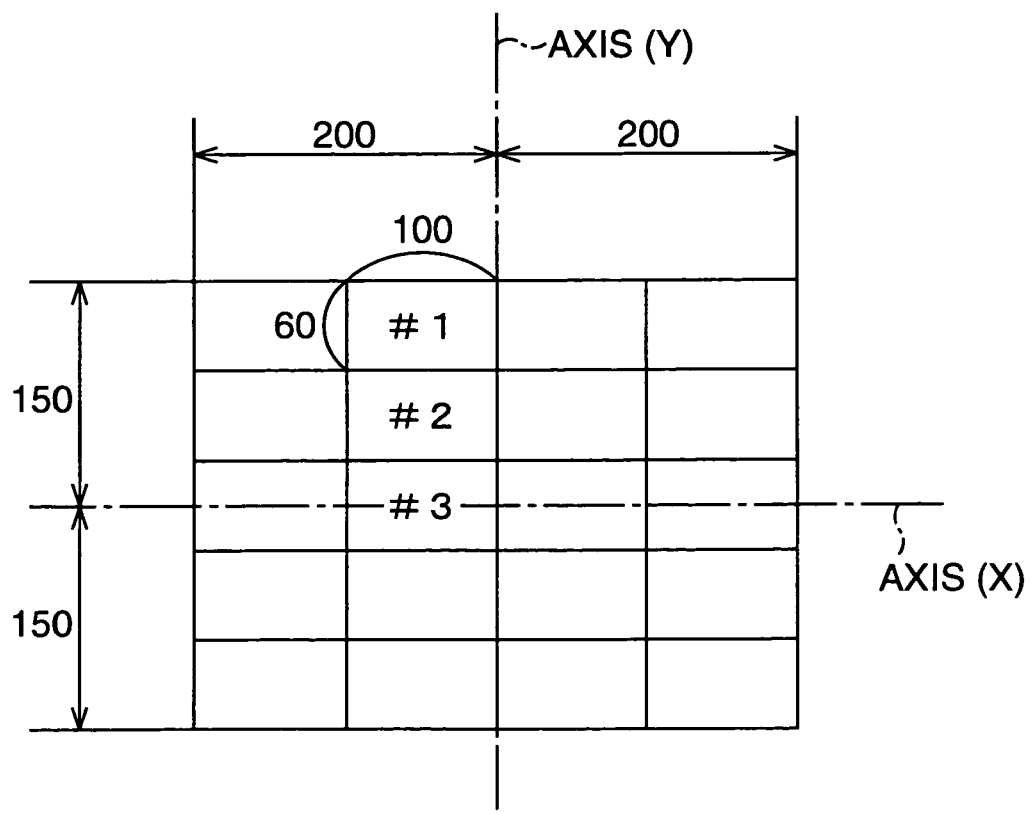
FIG. 8 is a diagram showing a concrete example of the tile size.

FIG. 8 is a diagram showing a concrete example of the tile size.

In FIG. 8, the overall tile region (overall image following transformation) is set at 400×300. Furthermore, the size of the respective tiles is set at 100×60. The region of the uppermost tier of the second column from the left is designated as tile region #1, the region beneath this is designated as tile region #2, and the region beneath this is designated as tile region #3.

Figure 9:
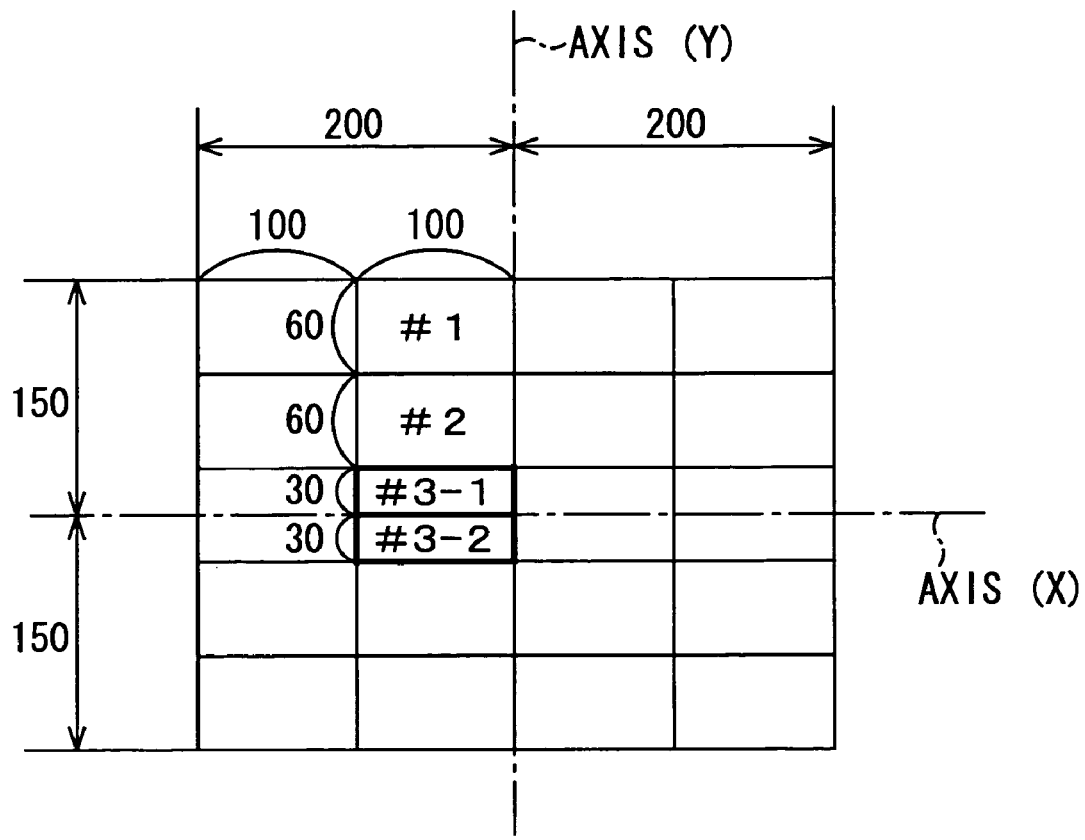
FIG. 9 is a diagram showing an example in which the tile size in FIG. 8 is altered.

In cases where tile region #3, which contains the X axis, is the region that is the object of processing, the tile size determining part 41 alters the tile size to 100×30 and splits tile region #3 into two tile regions #3-1 and #3-2 as shown in FIG. 9, so that tile region #3 is converted into a region that does not contain the X axis.

Thus, in cases where the tile region that is the object of processing is a region that contains a central axis, the tile size is altered so that this region is converted into a region that does not contain a central axis, thus allowing the secure read-out of the pixel data that is the object of processing from the storage part 18.

Furthermore, since only the pixel data contained in the region corresponding to the tile region is read out from the storage part 18 and taken as the object of processing, a sufficient amount of buffer (RAM 13) can be ensured compared to cases in which a single entire image is read out at one time, so that quick processing can be performed.

Thus, the regions are calculated, and processing is performed by the transformation processing part 45 on the basis of the read-out pixel data.

Specifically, the positions of the respective pixels for which data is read out are transformed according to equation (2) by the transformation processing part 45, so that an image in which distortion is corrected is obtained. In concrete terms, the region surrounded by the points A through D shown on the left side of FIG. 4 is transformed into a region having a shape that is free of distortion surrounded by the points a through d as shown on the right side of FIG. 4. Similarly, the region surrounded by the points A' through D' shown on the left side of FIG. 6 is transformed into a region having a shape that is free of distortion surrounded by the points a' through d' as shown on the right side of FIG. 6.

If necessary, furthermore, interpolation of the pixels can be performed by the transformation processing part 45.

Figure 10:
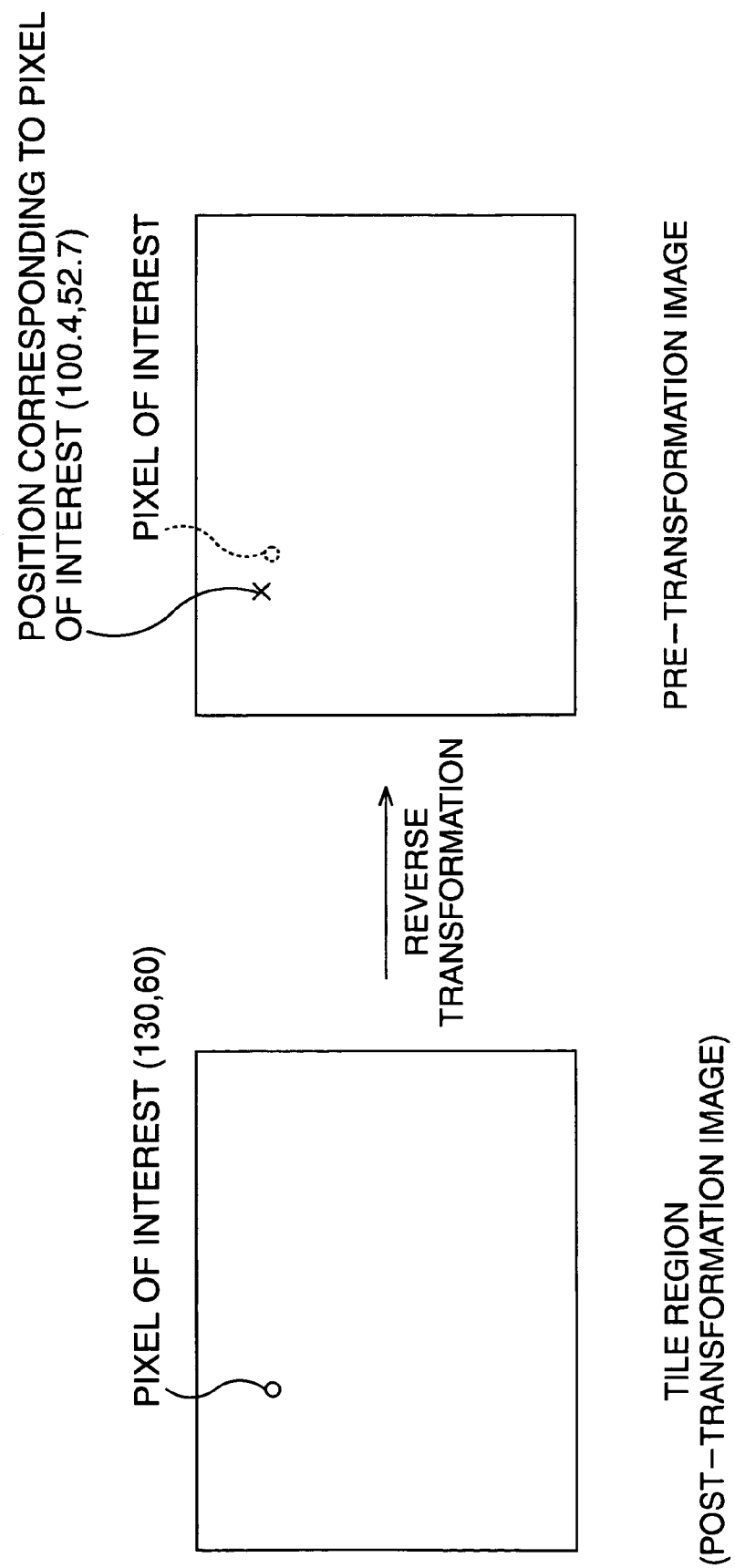
FIG. 10 is a diagram showing the interpolation of pixels.
Figure 11:
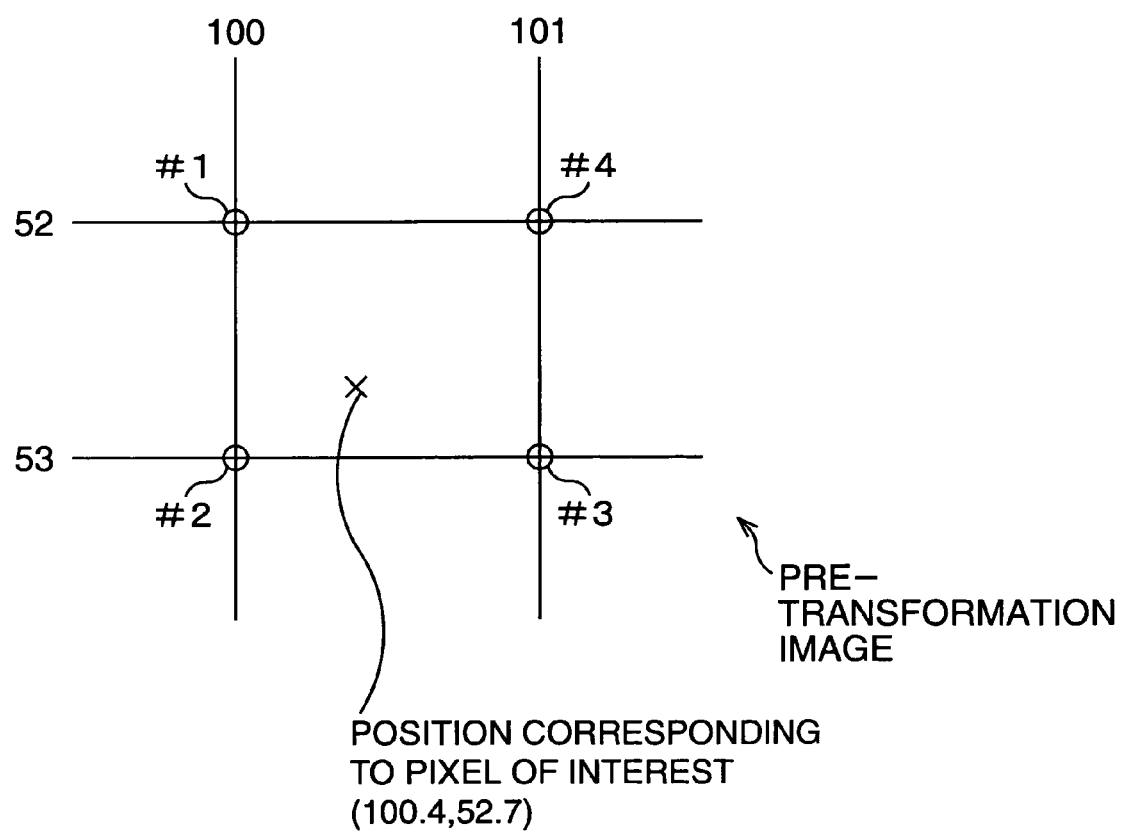
FIG. 11 is another diagram showing the interpolation of pixels.

FIGS. 10 and 11 are diagrams showing the interpolation of pixels.

In a case where the pixels (hereafter referred to as "pixels of interest" for convenience) located in the positions (130, 60) on the post-transformation image (tile region) shown on the left side of FIG. 10 are interpolated, positions on the pre-transformation image corresponding to the pixels of interest, e.g., (100.4, 52.7), are specified by a reverse transformation using equation (2), and interpolation is performed by means of the pixel values of pixels located in the vicinity of these specified positions.

For example, in a case where the positions on the pre-transformation image corresponding to the positions (130, 60) on the post-transformation image are specified as (100.4, 52.7), as is shown in FIG. 11, reference is made to the pixel value of pixel #1 located at the position (100, 52), the pixel value of pixel #2 located at the position (100, 53), the pixel value of pixel #3 located at the position (101, 53), and the pixel value of pixel #4 located at the position (101, 52), and the pixel of interest is interpolated. For instance, using the pixel values of these pixels #1 through #4, a relative determination is made from the value of the decimal point of (100.4, 52.7). For example, a determination may be made by linear interpolation.

Such projection transformation and interpolation processing are performed with the respective pixels contained in the tile region constituting the object of processing as objects. Furthermore, when the processing of all of the pixels contained in a certain tile region constituting the object of processing has been completed, the tile region taken as the object of processing is switched, and the processing is repeated until the processing of one entire image is completed.

Figure 12:
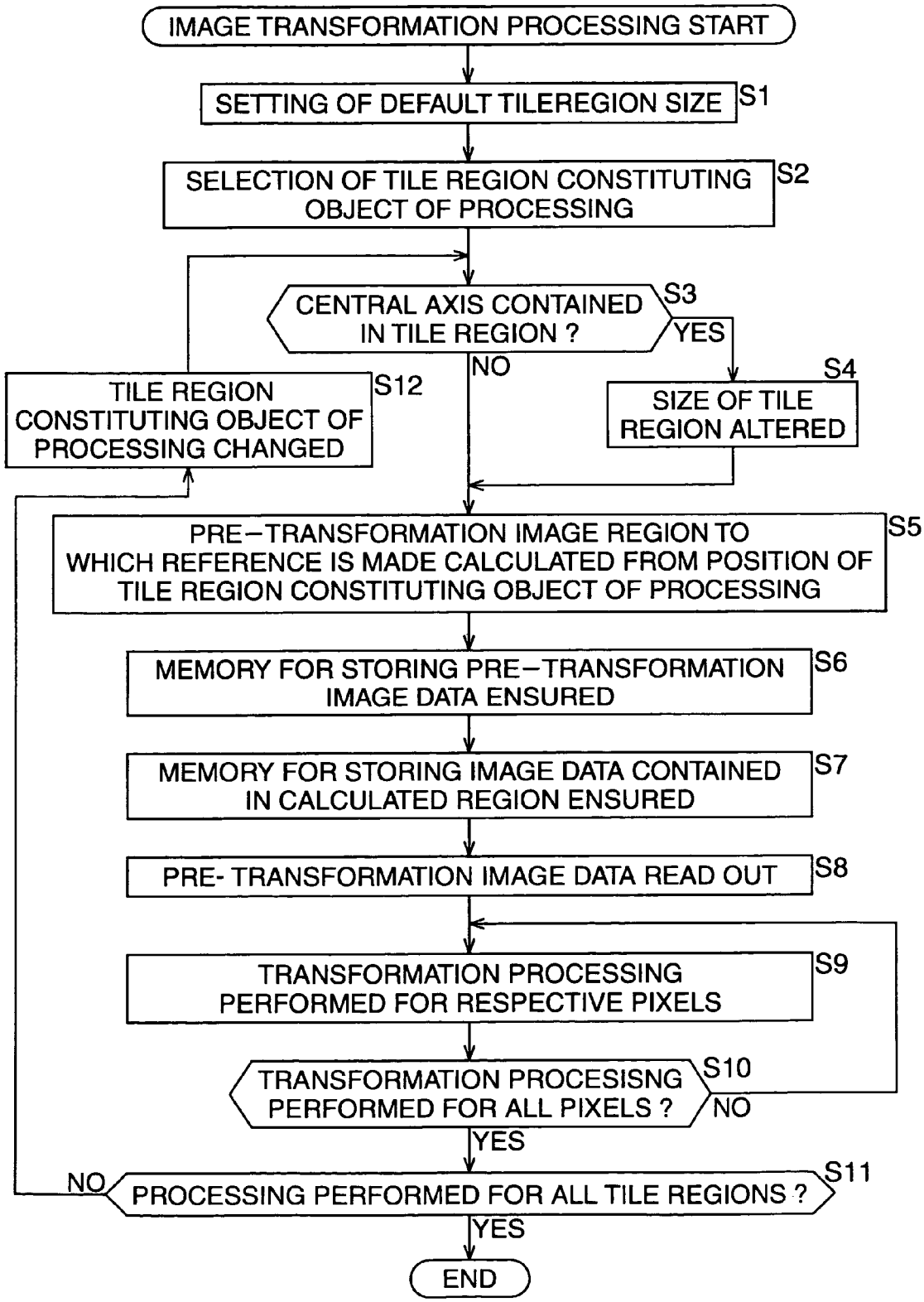
FIG. 12 is a flow chart illustrating the image transformation processing of the image transformation part.

Next, the image transformation processing performed by the image transformation part 31 will be described with reference to the flow chart shown in FIG. 12.

In step S1, the tile size determining part 41 sets the default tile size. The processing then proceeds to step S2, and the tile region that is the object of processing is selected. For example, as is shown in FIG. 8, tile regions with a size of 100×60 are set, and the tile region that is the object of processing is set from the region at the upper left.

In step S3, the tile size determining part 41 judges whether or not a central axis is contained in the tile region selected as the object of processing. In cases where it is judged that a central axis is contained in this tile region, the processing proceeds to step S4, and the size of the tile region that is the object of processing is altered as was described with reference to FIG. 9.

Information (size, position) relating to the tile region selected by the tile size determining part 41 is output to the image region calculating part 42.

In step S5, the image region calculating part 42 calculates the region on the pre-transformation image that corresponds to the tile region constituting the object of processing from the position of this tile region. For example, as was described with reference to FIGS. 4 through 7, regions that contain no curved lines are calculated as regions containing pixels to which reference is made. Information relating to the region calculated by the region calculating part 42 is output to the image data read/write part 43.

In step S6, the image data read/write part 43 ensures memory (post-transformation data buffer 52) for storing the post-transformation data, and then proceeds to step S7, and ensures memory (pre-transformation data buffer 51) for storing the pre-transformation data, i.e., the pixel data contained in the region calculated by the image region calculating part 42.

In step S8, the image data read/write part 43 reads out the pixel data contained in the region calculated by the image region calculating part 42 from the storage part 18, and stores this data in the pre-transformation data buffer 51.

In step S9, the transformation processing part 45 performs a projection transformation, interpolation processing and the like on the respective pixels for which data is stored in the pre-transformation data buffer 51, and stores the post-transformation data in the post-transformation data buffer 52. In step S10, the transformation processing part 45 judges whether or not a projection transformation and the like have been performed for all of the pixels read out as pixels corresponding to the tile region that is the object of processing. In cases where it is judged that such a transformation has not been performed for all of the pixels, the processing returns to step S9, and the processing is repeated for the respective pixels.

On the other hand, in cases where it is judged in step S10 that the projection transformation and the like have been performed for all of the pixels, the processing proceeds to step S11, and the transformation processing part 45 then judges whether or not processing has been performed for all of the tile regions. In cases where the transformation processing part 45 judges in step S11 that processing has not been performed for all of the tile regions, the processing proceeds to step S12.

In step S12, the tile size determining part 41 changes the tile region that is the object of processing, and repeats the processing from step S3 on. In cases where it is judged in step S11 that processing has been performed for all of the tile regions, the processing is ended, and the data for one entire image with correction distortion is output from the image transformation part 31.

The data that is output from the image transformation part 31 is again stored in the storage part 18, or is used to display an image on the display.

Thus, since one image is divided into a plurality of regions, and processing is performed with the respective regions as objects of processing, processing can easily be performed even in cases where sufficient memory cannot be ensured.

Furthermore, since the region that is the object of processing is designated as a region that contains no curved lines, read-out of the pixel data contained in the region that is the object of processing can easily be accomplished.

Moreover, in cases where the tile region contains a central axis, the read-out of data is performed after the size is altered so that the region contains no central axis; accordingly, the failure of the read-out of pixels that are the object of the projection transformation and pixel data that is referred to in interpolation can be prevented.

In the above process, in cases where the tile region that was the object of processing contained a central axis, the tile size was altered only for that region. However, it would also be possible to devise the system so that the size of all the tile regions is altered in cases where some tile region contains a central axis.

For example, in cases where the size of one entire image is 2X×2Y (horizontal×vertical), and the default tile size is A×B, the tile size is calculated from the following equations (3) and (4), and is altered to A'×B'.

[Equation 3]

$$Nx = X/A \text{ (}Nx \text{ is an integer; the decimal portion is discarded)}$$

$$Ny = Y/B \text{ (}Ny \text{ is an integer; the decimal portion is discarded)} \quad (3)$$

[Equation 4]

$$A' = X/Nx$$

$$B' = Y/Ny \quad (4)$$

For example, as is shown in FIG. 8, in cases where the size of one entire image is 400×300 (X=200, Y=150), and the default tile size is 100×60 (A=100, B=60), Nx=2, Ny=2 is calculated from equation (3), and A'=100, B'=75 is calculated by substituting these values into equation (4).

Figure 13:
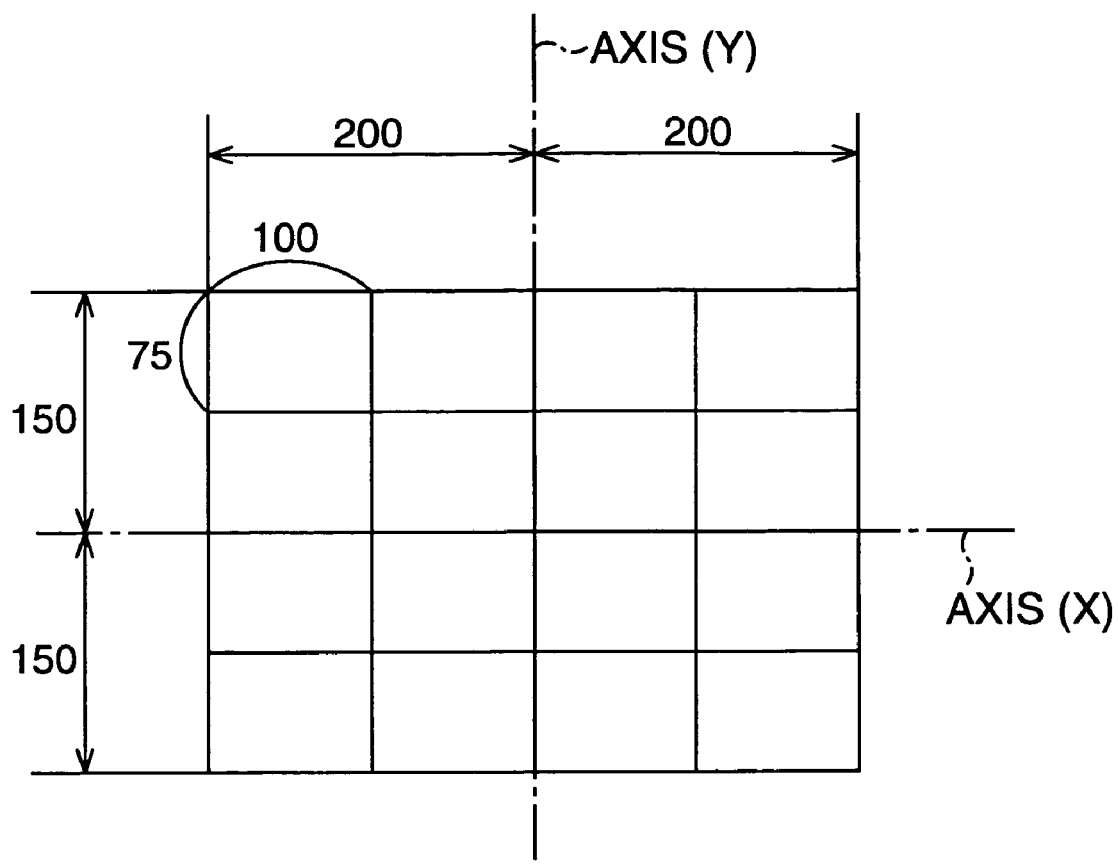
FIG. 13 is a diagram showing an example in which the tile size is altered.

The sizes of all of the tile regions are altered by the values thus calculated, so that the tile regions shown in FIG. 8 are altered to tile regions having the size shown in FIG. 13. In FIG. 13, all of the tile regions are altered to tile regions having a size of 100×75.

The alteration of the tile size may be accomplished by any desired method as long as the tile regions are converted into regions which thus contain no central axes.

Figure 14:
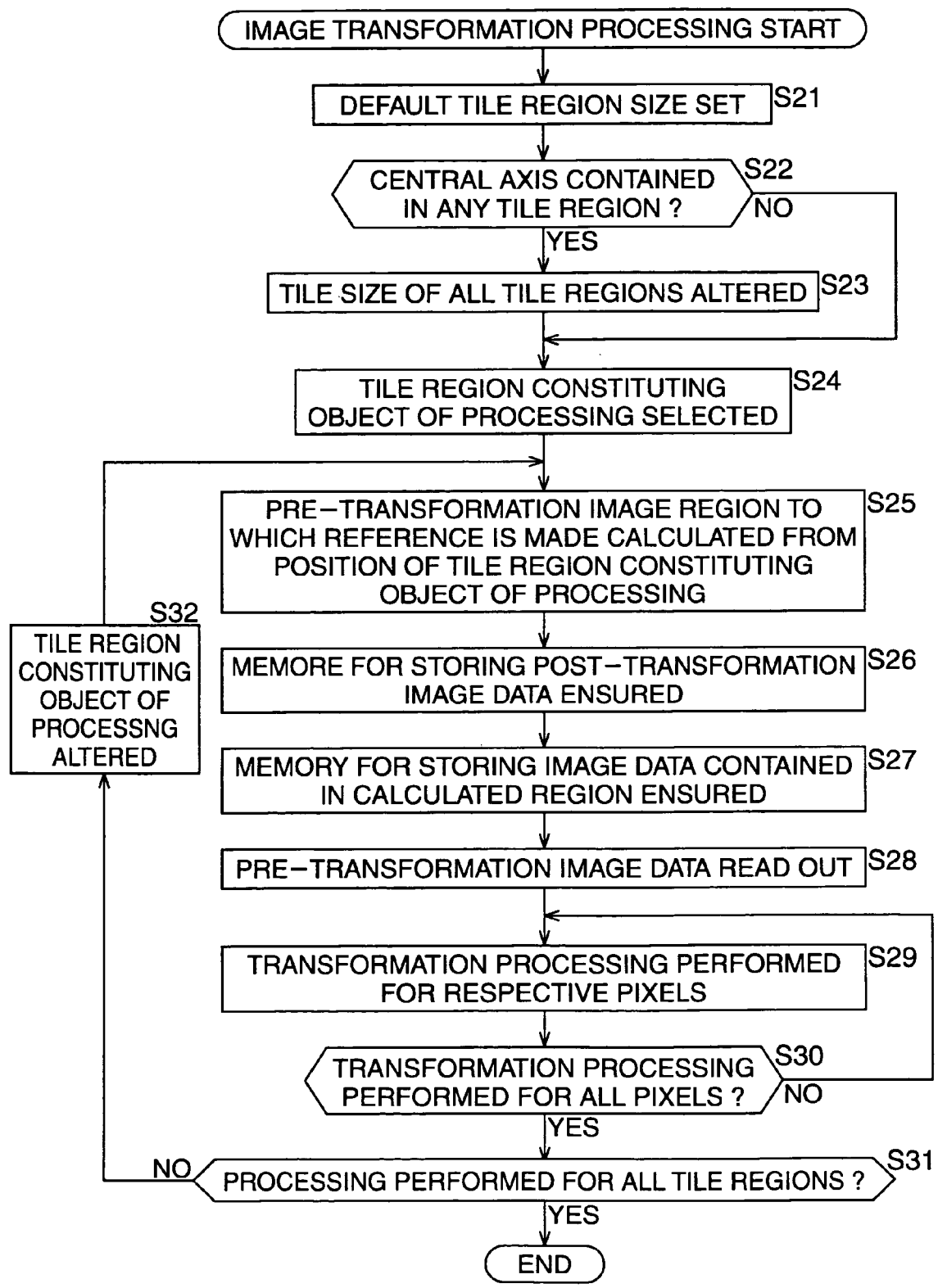
FIG. 14 is a flow chart illustrating other image transformation processing.

Here, the processing performed by the image transformation part 31, which performs an image transformation by altering the size of all of the tile regions in cases where a central axis is contained in any of the tile regions, will be described with reference to the flow chart shown in FIG. 14.

In step S21, the tile size determining part 41 sets the default tile size, and then proceeds to step S22 and judges whether or not a central axis is contained in any of the tile regions.

In cases where the tile size determining part 41 judges in step S22 that a central axis is contained in one of the tile regions, the tile size determining part 41 proceeds to step S23 and alters the tile size in accordance with (for example) the abovementioned equations (3) and (4). As a result, as is shown in FIG. 13, the tile size is altered so that no central axes are contained in any of the tile regions.

On the other hand, in cases where it is judged in step S22 that no central axis is contained in any of the tile regions, step S23 is skipped.

The processing from step S24 on is the same as the processing described with reference to FIG. 12. Specifically, in step S24, the tile region that is the object of processing is selected by the image region calculating part 42, and in step S25, the region on the pre-transformation image that corresponds to this tile region that is the object of processing is calculated from the position of this tile region.

In step S26, the post-transformation data buffer 52 for storing the post-transformation data is ensured; the processing then proceeds to step S27, and the pre-transformation data buffer 51 for storing the pre-transformation data is ensured.

In step S28, the pixel data contained in the region calculated by the image region calculating part 42 is read out from the storage part 18 by the image data read/write part 43, and is stored in the pre-transformation data buffer 51.

In step S29, a projection transformation and interpolation processing are performed by the transformation processing part 45 for the respective pixels stored in the pre-transformation data buffer 51, and the post-transformation data is stored in the post-transformation data buffer 52. In step S30, a judgment is made as to whether or not a projection transformation and the like have been performed for all of the read-out pixels; then, in cases where it is judged in step S31 that processing has been performed for all of the tile regions, the processing is ended.

As a result of the above processing as well, tile regions that contain no central axes can be set, and the pixels that are the object of processing can be reliably read out from the storage part 18.

In the above description, a case was described in which the X axis was contained in the tile region. However, the tile size is also similarly altered to produce regions containing no central axes in cases where the Y axis is contained in the tile region, or in case where both the X axis and Y axis are contained in the tile region.

The abovementioned series of processing operations can be performed by means of hardware, or can be performed by means of software.

In cases where this series of processing operations is executed by means of software, the programs constituting the software can be installed in a computer assembled with special hardware, or (for example) an all-purpose personal computer which can execute various types of functions by the installation of various types of programs, from a network or recording medium.

As is shown in FIG. 1, this recording medium can be constructed from a removable medium 21 that is used to distribute programs to the user separately from the device proper, and that consists of a magnetic disk (including flexible disks), optical disk (including CD-ROM (compact disk read only memories), DVD (digital versatile disks)), optical magnetic disk (including MD (registered trademark (Mini-Disk)), semiconductor memory or the like. Alternatively, such media can be constructed from a ROM 12 in which the programs are recorded, a hard disk contained in the storage part 18 or the like, which is provided to the user beforehand in a state in which this medium is built into the device proper.

Furthermore, in the present specification, the steps describing the programs recorded in the recording medium may of course be processing that is performed in a time series in accordance with the order described, but also includes processing that is performed in parallel or separately rather than necessarily being performed in a time series.

The invention claimed is:

1. An image processing method for projection transforming of an original image into a transformed image, the transformed image correcting distortion of the original image, the method comprising:
   partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;
   determining, for each region of the plurality of regions defined in the whole area of the transformed image, a corresponding region in the original image that corresponds to each of the plurality of regions defined in the whole area of the transformed image; and
   performing the projection transformation for each of the corresponding regions defined in the original image to obtain the transformed image, wherein
   the partitioning step includes:
     a first partitioning step carrying out the partitioning at a predetermined size so that the whole area of the transformed image is partitioned into a plurality of first regions; and
     a second partitioning step changing a size of each of the plurality of first regions partitioned in the first partitioning step, into second regions, so that none of the second regions is intersected by any of the axes, and
   the determining step determines, based on the second regions, the corresponding regions in the original image.

2. The image processing method according to claim 1, wherein
   the second partitioning step is carried out such that a width of a first region of the plurality of first regions is changed into a maximum value of a divisor of a half value of a width of the whole area of the transformed image, where the maximum value does not exceed the width of the first region, and
   a height of the first region of the plurality of first regions is changed into a maximum value of a divisor of a half value of a height of the whole area of the transformed image, where the maximum value does not exceed the height of the first region.

3. The image processing method according to claim 1, wherein
   the second partitioning step is carried out such that when dimensions of a second region of the second regions does not exceed dimensions of a first region of the plurality of first regions, a width of the first region is changed into any divisors of a half value of a width of the whole area of the transformed image, and
   a height of the first region of the plurality of first regions is changed into any divisors of a half value of a height of the whole area of the transformed image.

4. An image processing method for projection transforming of an original image into a transformed image, the transformed image correcting distortion of the original image, the method comprising:
   partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;
   determining, for each region of the plurality of regions defined in the whole area of the transformed image, a corresponding region in the original image that corresponds to each of the plurality of regions defined in the whole area of the transformed image; and
   performing the projection transformation for each of the corresponding regions defined in the original image to obtain the transformed image, wherein
   the partitioning step includes:
     a first partitioning step carrying out the partitioning at a predetermined size so that the whole area of the transformed image is partitioned into a plurality of first regions; and
     a second partitioning step further partitioning each of the plurality of first regions partitioned in the first partitioning step that is intersected by one of the axes into second regions, so that none of the second regions is intersected by any of the axes, and
   the determining step determines, based on the plurality of first regions and second regions, the corresponding regions in the original image.

5. An image processing device for projection transforming an original image into a transformed image, the transformed image correcting distortion of the original image, the device comprising:
   partition means for partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;

determination means for determining, for each region of the plurality of regions defined in the whole area of the transformed image, a corresponding region in the original image that corresponds to each of the plurality of regions defined in the whole area by the partition means; and transformation means for performing the projection transformation for each of the corresponding regions determined by the determination device to obtain the transformed image, wherein the partition means includes:
a first partitioning means for carrying out the partitioning at a predetermined size so that the whole area of the transformed image is partitioned into a plurality of first regions; and
a second partitioning means for changing a size of each of the plurality of first regions partitioned by the first partitioning means, into second regions, so that none of the second regions is intersected by any of the axes, and the determining means determines, based on the second regions, the corresponding regions in the original image.

6. The image processing device according to claim 5, wherein
the second partition means changes a width of a first region of the plurality of first regions into a maximum value of a divisor of a half value of a width of the whole area of the transformed image, where the maximum value does not exceed the width of the first region, and
a height of the first region of the plurality of first regions is changed into a maximum value of a divisor of a half value of a height of the whole area of the transformed image, where the maximum value does not exceed the height of the first region.

7. The image processing device according to claim 5, wherein
the second partition means changes (1) a width of the first region into any divisors of a half value of a width of the whole area of the transformed image and (2) a height of the first region of the plurality of first regions into any divisors of a half value of a height of the whole area of the transformed image when dimensions of a second region of the second regions does not exceed dimensions of a first region of the plurality of first regions.

8. A non-transitory computer-readable medium storing an executable program, the program, when executed, causing a computer to execute a process for projection transforming an original image into a transformed image, the transformed image correcting distortion of the original image, the executable program comprising:
partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;
determining, for each region of the plurality of regions defined in the whole area of the transformed image, a corresponding region in the original image that corresponds to each of the plurality of regions defined in the whole area of the transformed image; and
performing the projection transformation for each of the corresponding regions defined in the original image to obtain the transformed image, wherein the partitioning step includes:
a first partitioning step carrying out the partitioning at a predetermined size so that the whole area of the transformed image is partitioned into a plurality of first regions; and
a second partitioning step changing a size of each of the plurality of first regions partitioned in the first partitioning step, into second regions, so that none of the second regions is intersected by any of the axes, the determining step determines, based on the second regions, the corresponding regions in the original image.

9. The non-transitory computer-readable medium according to claim 8, wherein
the second partitioning step is carried out such that a width of a first region of the plurality of first regions is changed into a maximum value of a divisor of a half value of a width of the whole area of the transformed image, where the maximum value does not exceed the width of the first region, and
a height of the first region of the plurality of first regions is changed into a maximum value of a divisor of a half value of a height of the whole area of the transformed image, where the maximum value does not exceed the height of the first region.

10. The non-transitory computer-readable medium according to claim 8, wherein
the second partitioning step is carried out such that when dimensions of a second region of the second regions does not exceed dimensions of a first region of the plurality of first regions, a width of the first region is changed into any divisors of a half value of a width of the whole area of the transformed image, and
a height of the first region of the plurality of first regions is changed into any divisors of a half value of a height of the whole area of the transformed image.

11. An image processing device for projection transforming an original image into a transformed image, the transformed image correcting distortion of the original image, the device comprising:
partition means for partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;
determination means for determining, for each region of the plurality of regions defined in the whole area of the transformed image, a corresponding region in the original image that corresponds to each of the plurality of regions defined in the whole area by the partition means; and
transformation means for performing the projection transformation for each of the corresponding regions determined by the determination device to obtain the transformed image, wherein the partition means includes:
a first partitioning means for carrying out the partitioning at a predetermined size so that the whole area of the transformed image is partitioned into a plurality of first regions; and
a second partitioning means for further partitioning each of the plurality of first regions partitioned by the first partitioning means that intersect one of the axes into second regions, so that none of the second regions is intersected by any of the axes, and the determining means determines, based on the plurality of first regions and second regions, the corresponding regions in the original image.

12. A non-transitory computer-readable medium storing an executable program, the program, when executed, causing a computer to execute a process for projection transforming an original image into a transformed image, the transformed image correcting distortion of the original image, the executable program comprising:

partitioning a whole area of the transformed image to be obtained by a projection transformation of the original image into a plurality of regions, wherein none of the plurality of regions is intersected by either a vertical axis or a horizontal axis, the vertical and horizontal axes extending in a plane containing the transformed image and passing through an origin at a center of the whole area;

determining, for each region of the plurality of regions defined in the whole area of the transformed image, a corresponding region in the original image that corresponds to each of the plurality of regions defined in the whole area of the transformed image; and performing the projection transformation for each of the corresponding regions defined in the original image to obtain the transformed image, wherein the partitioning step includes:

a first partitioning step carrying out the partitioning at a predetermined size so that the whole area of the transformed image is partitioned into a plurality of first regions; and a second partitioning step further partitioning each of the plurality of first regions partitioned in the first partitioning step that intersect one of the axes into second regions, so that none of the second regions is intersected by any of the axes, and the determining step determines, based on the plurality of first regions and second regions, the corresponding regions in the original image.

\* \* \* \* \*